United States Patent [19]
Walton

[11] Patent Number: 4,463,960
[45] Date of Patent: Aug. 7, 1984

[54] SELF-ADJUSTING CHUCKS

[76] Inventor: Jean Walton, 69 S. Hill Park, London, NW3, England

[21] Appl. No.: 262,678

[22] Filed: May 11, 1981

[51] Int. Cl.³ .............................................. B23B 31/12
[52] U.S. Cl. ..................................... 279/60; 279/1 B; 279/1 TE
[58] Field of Search .................. 279/1 R, 1 B, 28, 60, 279/65, 1 SG, 1 TE

[56] References Cited
U.S. PATENT DOCUMENTS

| | | | |
|---|---|---|---|
| 1,361,571 | 12/1920 | Eden, Jr. | 279/1 R |
| 2,292,470 | 8/1942 | Ostberg | 279/60 |
| 2,910,302 | 10/1959 | Ondeck | 279/1 SG |
| 3,006,098 | 10/1961 | Harke | 279/60 X |
| 3,674,281 | 7/1972 | Hedrick | 279/1 B X |
| 4,213,355 | 7/1980 | Colvin | 279/65 X |

FOREIGN PATENT DOCUMENTS

| | | | |
|---|---|---|---|
| 2855284 | 7/1979 | Fed. Rep. of Germany | 279/1 B |
| 681717 | 5/1930 | France . | |
| 43321 | 11/1917 | Sweden | 279/60 |
| 309858 | 9/1930 | United Kingdom . | |
| 465128 | 5/1937 | United Kingdom . | |
| 579224 | 7/1946 | United Kingdom . | |

*Primary Examiner*—Francis S. Husar
*Assistant Examiner*—Steven B. Katz
*Attorney, Agent, or Firm*—Beveridge, DeGrandi and Kline

[57] ABSTRACT

A chuck comprising a body, an aperture formed in a front portion of the body, jaws which are housed in the aperture and which are retractable to enable insertion of a bit, a jaw clamp for applying pressure on the jaws such that in use they clamp against a bit and retain the bit in the chuck, a track positioned in the body, and a drive fitting which is located at a rear portion of the body and which is for enabling the chuck to be connected to and rotatably driven by a drive tool, the jaw clamp comprising an axially movable cylindrical member, a clamping device for moving the axially movable cylindrical member in a forward direction towards the jaws and for causing a pressure to be applied to the jaws when the jaws are in their bit clamping position, and a spring positioned for biasing the axially movable cylindrical member in a rearward direction towards the drive fitting, and the track extending in a longitudinal direction but also inclined to the longitudinal axis of the chuck.

6 Claims, 7 Drawing Figures

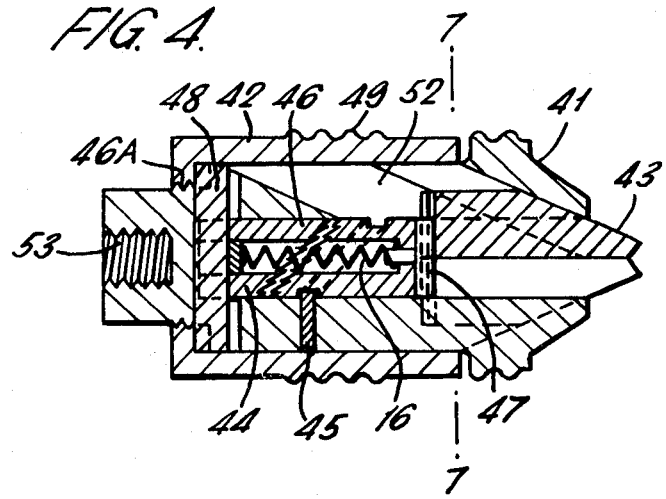
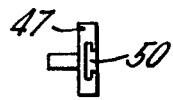
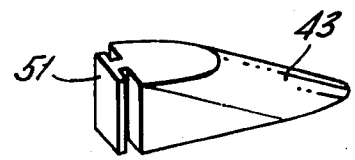
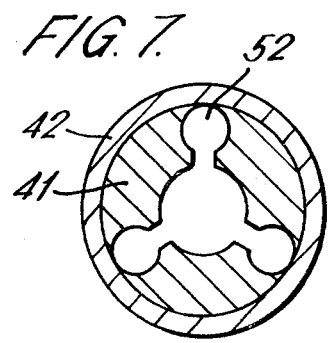

SELF-ADJUSTING CHUCKS

BACKGROUND OF THE INVENTION

1. Field of the Invention

This invention relates to self-adjusting chucks, whether for hand-held tools or machine tools.

2. Prior Art

Time taken in changing "bits" due to adjusting and tightening chucks, on hand-held power tools in particular, can be compounded with lost chuck keys and even injury if the drill or tool is accidentally started before the chuck key is removed.

Keyless chucks are known but they suffer from an anomaly in that either they cannot be tightened sufficiently by hand or they take a longer time to be adjusted than a chuck employing a chuck key.

In the case of known chucks there is often a need to re-tighten the chuck during use due to the work-torque which is applied to the jaws causing vibrations to be transmitted directly to the jaw-clamping threads, resulting in the chuck loosening.

The term "bit" is intended to include other tools besides drill bits which are required to be held in a chuck.

SUMMARY

According to the invention there is provided a chuck comprising a body, an aperture formed in a front portion of the body, jaws which are housed in the aperture and which are retractable to enable insertion of a bit, jaw clamping means for applying pressure on the jaws such that, in use they clamp against a bit and retain the bit in the chuck, track means positioned in the body, and a drive fitting which is located at a rear portion of the body and which is for enabling the chuck to be connected to and rotatably driven by a drive tool, the jaw clamping means comprising an axially movable member, a clamping device for moving the axially movable member in a forward direction towards the jaws and for causing a pressure to be applied to the jaws when the jaws are in their bit clamping position, and spring means positioned for biasing the axially movable member in a rearward direction towards the drive fitting, and the track means extending in a longitudinal direction but also being inclined to the longitudinal axis of the chuck whereby the track means causes a constant dimension to be maintained between a surface in the chuck and the axially movable member whereby the jaws are movable with respect to the axially movable member and the clamping device without changing the said constant dimension so that movement of the clamping device for clamping the jaws on an inserted bit is independent of movement of the jaws to accept bits of different sizes so that substantially the same degree of clamping movement is required of the clamping device to clamp the jaws on all inserted bits irrespective of the size of the bits and whereby substantially different degrees of clamping movement for different sizes of bits are obviated.

The chuck may be such that for jaw clamping purposes the axially movable member operates on the jaws through an intermediate member which is cylindrical, the track means being a helical groove which is formed in the intermediate member, and the helical groove being engaged by a first member located in the body of the chuck.

The first member may be mounted in the body by a compressible member which allows the first member a limited degree of movement towards the jaws.

The axially movable member may be a cylindrical member having a recess, the recess being engaged by a second member located in the body of the chuck.

Preferably, the two adjacent ends of the axially movable member and the intermediate member are each provided with teeth for enabling the axially movable member and the intermediate member to engage each other and then to be pressed axially together away from the drive fitting under the action of the clamping device to cause the jaws to clamp on an inserted bit.

The chuck may be such that for jaw clamping purposes the axially movble member operates directly on the jaws, the track means being slots in which the jaws are constrained to slide, and the slots extending longitudinally but at an angle to the longitudinal axis of the chuck.

The clamping device may include a cam, or an axially movable bar that is prevented from axial rotation by being located in the body of the chuck, or a rotatable collar.

BRIEF DESCRIPTION OF THE DRAWINGS

FIG. 4 is a section through another chuck;

FIG. 5 shows the jaws coordinating member of the chuck of FIG. 4;

FIG. 6 is a perspective view of one of the jaws of the chuck of FIG. 4; and

FIG. 7 is a section through the body and the surrounding sleeve of the chuck of FIG. 4 taken along the line 7—7.

DESCRIPTION OF THE PREFERRED EMBODIMENTS

Figure 1:
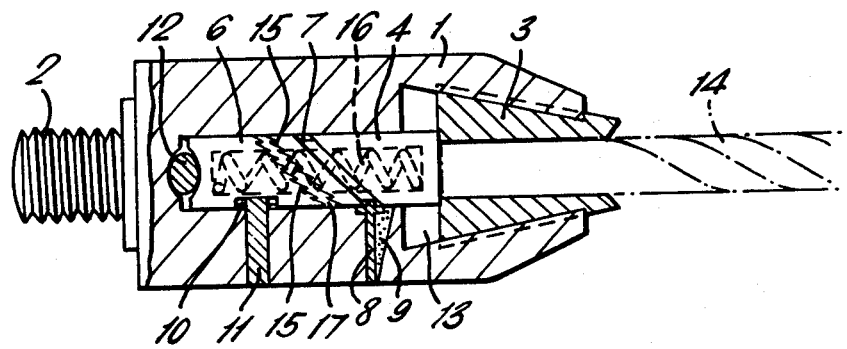
FIG. 1 is a section through one embodiment of a chuck.
Figure 2:
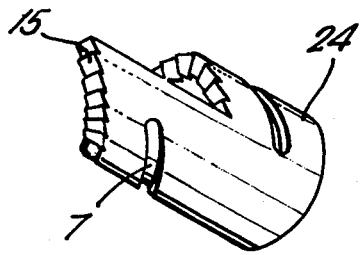
FIG. 2 is a perspective view of one of the jaw operated cylinders of the chuck of FIG. 1.

FIGS. 1 and 2 illustrate diagrammatically a chuck having a one-piece body 1 and at one end a threaded spigot 2 forming a drive fixing for mounting the chuck in a power tool. The jaws 3, which may be any convenient number, are housed in an appropriate cavity 13 in the other end of the body in a manner which allows the jaws to slide longitudinally of the body to accommodate bits 14 having different diameter shanks. Inward movement of the jaws is effected by the bit itself, and the outer ends of the jaws define a lead-in to assist insertion of the bit. The chuck is thus self-adjusting.

Means for clamping the jaws 3 onto the inserted bit include two cylinders 4, 6 extending end to end along an axial bore within the chuck body 1. The adjacent ends of the cylinders 4, 6 have the same helical shape (only shown schematically in FIG. 1) and teeth 15 which interengage when the cylinders are brought together to lock the cylinders against relative rotation. The cylinder 14 is also engaged by the inner ends of the jaws and a light spring 16 acts between the cylinders 4, 6 to apply pressure to the jaws via the cylinder 4 to close the jaws with the bit is removed.

The cylinder 4 has track means in form of a helical groove 7 having the same angle and length as the helical cylinder ends. Within the groove fits a first member in the form of a peg 8 which is fixed in the chuck body 1 but, in this embodiment, is provided with a compressible member 9 which allows the peg a slight movement towards the jaws. The provision of the peg and the groove will cause the cylinder 4 to turn during rearward movement of the cylinder.

The other cylinder 6 has a slot 10 engaged by a second member in the form of a peg 11 which allows the cylinder a small degree of longitudinal movement, but not to rotate. Thus the cylinder 6 is an axially movable member.

In operation, if the jaws are pushed backwards by a bit, the cylinder 4 will be pushed inwardly, and will turn as it slides, whilst the cylinder 6 remains stationary. Hence the adjacent ends of the cylinders 4, 6 will turn past one another with a constant length of gap between them.

When the jaws are open enough for the bit shank to enter and pushing stops, there is still the same axial dimension of gap 17 between cylinders 4 and 6, whatever diameter of shank has been inserted.

The cylinder 6 is then moved towards the cylinder 4 by rotation of a lever operated cam 12 until the teeth 15 engage and prevent relative rotation of the cylinders. Further pressure applied to the end of the cylinder 6 remote from the jaws, for instance by the cam 12 causes a force to be applied by the cylinder 4 against the jaws to make them grip the bit in the normal manner. The peg 8 can move forward slightly to allow for any strain as the stress on the cylinder 4, jaws 3, body 1 and bit 14 increases.

Return movement of the cam releases the pressures, and peg 8 retracts cylinder 4 from any strain displacement and the bit 14 is freed for removal. The lever (not shown) for activating the cam extends parallel to the axis of the chuck and flush with the body 1 when this lever is in the clamping position.

Figure 3:
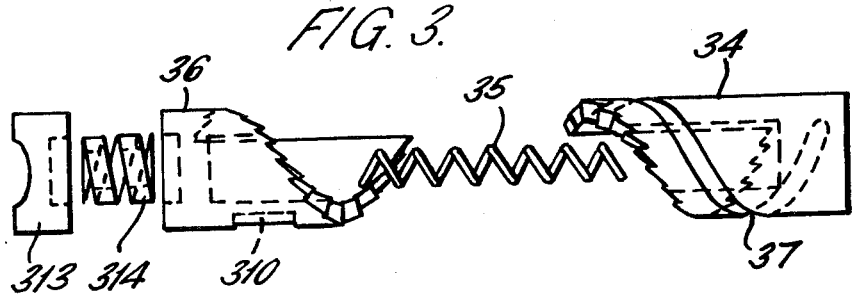
FIG. 3 is an exploded view of modified clamping means.

FIG. 3 shows a different clamping arrangement having an additional cylinder 313 and a strong spring 314, or other compressible element, between the cam 12 and the cylinders 36, 34 which are equivalent to the cylinders 6, 4 respectively of the embodiment of FIGS. 1 and 2. The provision of the strong spring 314 in addition to the light spring 35 achieves a desired predetermined force between the pressure applied by the cam and the pressure applied by the cylinder 34 on the jaws and also a more constantly correct gripping force on the bit, regardless of any abrasion of the bit shank during use which would otherwise require retightening of the chuck.

The embodiment of FIGS. 4 to 7 is similar in principle to the embodiment of FIGS. 1 and 2. The body 41 is again of one piece construction but in this case has a female drive fixing 53. The jaws 43 and cylinders 44, 46 are substantially the same as before (again the helical ends and groove are shown schematically for clarity) except that the cylinder 44 applies pressure to the jaws indirectly via a coordinating member 47. This member 47 (FIG. 4) has three rebated grooves 50 for reception of equivalently shaped retaining elements 51 on the jaws 43 (FIG. 5).

The cam is also replaced by a bar 48 which extends through a transverse hole in the chuck body and an aligned slot in the end of the cylinder 46 remote from the jaws 43. This bar prevents the cylinder 46 from rotating and thereby allowing the previously described slot 10 and peg 11 to be omitted. Axial movement of the bar 48 both to move the cylinder 46 into locking engagement with the cylinder 44 and causes clamping of the inserted bit is effected by a sleeve 42 which is in screw-threaded engagement with the chuck body at a screw threaded portion 46A of the chuck body. To assist rotation of the sleeve, both the sleeve and the body are provided with knurling 49. Since the basic adjustment of the jaws is effected by the bit itself, it is possible to clamp the bit with a small amount of rotation of the sleeve 42, e.g. one turn or less.

FIG. 7 shows the three milled slots 52 provided in the chuck body 41 for mounting the jaws 43. This particular arrangement allows the chuck body 41 to be produced by a single multioperation automatic machine.

The invention is not restricted to the specific details of the embodiments described above. For example, the cylinders may be locked together against relative rotation by friction, in which case the cylinders need not have a separating gap when the clamping pressure is released.

Also the cylinders may be replaced by wedge-shaped members, the motion of which maintains the inclined surfaces parallel to one another and maintains a constant distance between them at some point or points, which distance may again be zero if desired.

In another embodiment, the same function is achieved by members, which may be the jaws themselves, which slide at an angle to the axis of the chuck body, and keep a constant dimension relative to a cone or pyramid which subsequently is caused to apply the clamping pressure to the jaws.

The locking together of the members may be achieved by interengaging teeth or protrusions, or friction, or magnetic force.

If desired unlocking movement of the jaw clamping mechanism may operate a switch, key or clutch to cut off the power source to the chuck. For example, loosening of the sleeve 42 could be arranged to depress a switch protruding from the adjacent end of the power tool body.

An advantage of each chuck described above is that it allows the bit changing time to be substantially reduced compared with conventional chucks, since the chuck is self-adjusting to the inserted bit, leaving just a quick clamping action to hold the bit tight.

Also, the tightening thread or cam is not directly vibrated by the work torque and thus the chuck should not loosen during use and thereby require re-tightening. Moreover, a predetermined spring pressure can readily be used if necessary to maintain the jaw grip on the bit even if strain or abrasion has otherwise loosened it.

Furthermore, whereas in each embodiment described above there is a one piece body, the construction may also be in the form of a two or more piece body. In this case the work-torque could be used for tightening the grip on the bit. This could be achieved, for instance, by the sleeve 42 in FIG. 4 being in one piece with the drive fixing member 53, which together then screw on the remainder of the body 41, for the purpose of tightening the jaws. Such a construction would give the possibility of automatic jaw tightening.

I claim:

1. A chuck comprising a body, an aperture formed in a front portion of the body, jaws which are housed in the aperture and which are retractable to enable insertion of a bit, jaw clamping means for applying pressure on the jaws such that in use they clamp against a bit and retain the bit in the chuck, a cylindrical member, track means positioned in the body, said track means being a helical groove which is formed in the cylindrical member, a first member located in the body of the chuck and engaging the cylindrical groove, and a drive fitting which is located at a rear portion of the body and which is for enabling the chuck to be connected to and rotatably driven by a drive tool, the jaw clamping means comprising an axially movable member, a clamping device for moving the axially movable member in a forward direction towards the jaws and for causing a pressure to be applied to the jaws when the jaws are in their bit clamping position, said axially movable member being operable on the jaws through said cylindrical member for jaw clamping purposes, and spring means positioned for biasing the axially movable member in a rearward direction towards the drive fitting, and the track means extending in a longitudinal direction but also being inclined to the longitudinal axis of the chuck whereby the track means causes a constant dimension to be maintained between a surface in the chuck and the axially movable member whereby the jaws are movable with respect to the axially movable member and the clamping device without changing the said constant dimension so that movement of the clamping device for clamping the jaws on an inserted bit is independent of movement of the jaws to accept bits of different sizes so that substantially the same degree of clamping movement is required of the clamping device to clamp the jaws on all inserted bits irrespective of the size of the bits and whereby substantially different degrees of clamping movement for different sizes of bits are obviated.

2. A chuck according to claim 1 in which the first member is mounted in the body by a compressible member which allows the first member a limited degree of movement towards the jaws.

3. A chuck according to claim 1 in which the axially movable member is a cylindrical member having a recess, the recess being engaged by a second member located in the body of the chuck.

4. A chuck according to claim 1 in which two adjacent sides of the axially movable member and the cylindrical member are each provided with teeth for enabling the axially movable member and the cylindrical member to engage each other and then to be pressed axially away from the drive fitting under the action of the clamping device to cause the jaws to clamp on an inserted bit.

5. A chuck according to claim 2 in which two adjacent ends of the axially movable member and the cylindrical member are each provided with teeth for enabling the axially movable member and the cylindrical member to engage each other and then to be pressed axially away from the drive fitting under the action of the clamping device to cause the jaws to clamp on an inserted bit.

6. A chuck according to claim 3 in which two adjacent ends of the axially movable member and the cylindrical member are each provided with teeth for enabling the axially movable member and the cylindrical member to engage each other and then to be pressed axially away from the drive fitting under the action of the clamping device to cause the jaws to clamp on an inserted bit.

* * * * *